United States Patent [19]

Andrepont

[11] 4,372,766
[45] Feb. 8, 1983

[54] APPARATUS AND METHOD FOR CONCENTRATING A LIQUID MIXTURE BY FREEZING THE SOLVENT

[75] Inventor: John S. Andrepont, Downers Grove, Ill.

[73] Assignee: Chicago Bridge & Iron Company, Oak Brook, Ill.

[21] Appl. No.: 321,463

[22] Filed: Nov. 16, 1981

[51] Int. Cl.³ .............................................. B01D 9/02
[52] U.S. Cl. ........................................ 62/532; 62/542; 62/123; 210/512.1
[58] Field of Search ................. 62/532, 542, 123, 124; 210/512.1

[56] References Cited

U.S. PATENT DOCUMENTS

| | | | |
|---|---|---|---|
| 2,539,019 | 1/1951 | Hill | 210/512.1 |
| 2,703,748 | 3/1955 | Clarke et al. | 210/512.1 |
| 2,816,490 | 12/1957 | Boadway et al. | 210/512.1 |
| 3,012,409 | 12/1961 | Ashley | 62/123 |
| 3,285,422 | 11/1966 | Wiley | 210/512.1 |
| 4,046,534 | 9/1977 | Maguire, Sr. | 62/542 |

Primary Examiner—Norman Yudkoff
Attorney, Agent, or Firm—Merriam, Marshall & Bicknell

[57] ABSTRACT

Apparatus comprising a vertical vessel having a lower downwardly pointed conical shell portion, an intermediate shell portion and an upper shell portion wider than the lower and intermediate portions and with all said vessel portions surrounding and defining an unobstructed interior; a conduit for feeding a liquid stream, containing solids less dense than the liquid, tangentially to the vessel intermediate portion interior so that the liquid flows in a helical path therein and then flows downwardly to and in the lower conical portion whereby less dense liquid slurry concentrates in the central area of the lower conical portion and flows upwardly into the vessel upper portion while more dense liquid slurry concentrates in the vessel lower conical portion; a conduit to withdraw more dense liquid slurry from the vessel lower conical portion; and a distributor for directing washing liquid onto the slurry while the slurry is in the vessel upper portion.

A freeze concentration method of separating a liquid from a liquid mixture containing a dissolved material, said liquid being less dense in solid form than in liquid form, comprising cooling the liquid mixture containing the dissolved material to form crystals of the liquid; tangentially feeding the cold liquid mixture containing crystals of the liquid into the intermediate shell portion interior of a vertical vessel having a lower downwardly pointed conical shell portion, an intermediate shell portion and an upper shell portion wider than the lower and intermediate portions and with all said vessel portions surrounding and defining an unobstructed interior, so that the liquid flows in a helical path therein and then flows downwardly to and in the lower conical portion whereby a less dense liquid slurry of the crystals accumulates in the central area of the lower conical portion and flows upwardly into the vessel upper portion while a more dense liquid slurry of the crystals accumulates in the vessel lower conical portion; withdrawing the more dense liquid slurry from the vessel lower conical portion; collecting the less dense liquid slurry in the vessel upper portion and washing the crystal solids therein with the same, but pure, liquid as in the feed stream, and removing the washed crystals from the vessel.

13 Claims, 3 Drawing Figures

APPARATUS AND METHOD FOR CONCENTRATING A LIQUID MIXTURE BY FREEZING THE SOLVENT

This invention relates to apparatus for, and methods of, concentrating a liquid mixture such as fruit and vegetable juices, seawater, brackish water, waste water, and chemical solutions and dispersions, by freezing a portion of the solvent, usually water.

BACKGROUND OF THE INVENTION

It is often necessary, or at least desirable, to concentrate a liquid mixture by removing a portion of the solvent, generally water, from the liquid mixture. The resulting product, therefore, is in a more concentrated form. It has been common to concentrate fruit and vegetable juices such as orange juice, grapefruit juice, grape juice, and tomato juice by evaporation to remove water. In addition, seawater and brackish water have been concentrated by evaporation, although the condensed vapor has been recovered as usable potable water rather than discarded as in concentrating fruit and vegetable juices. Nevertheless, each is a concentrating process. In the case of juice, the concentrate is the desirable product; whereas, in obtaining potable water from seawater or brackish water the concentrate is discarded.

Evaporative concentration as described, as well as evaporation of chemical solutions or liquid dispersions, requires substantial energy since it relies on the latent heat of vaporization. Scaling of equipment and enhanced corrosion are often inherent at the temperatures involved in evaporative concentration. Loss of flavor and aroma also result during evaporative concentration of food products.

Because of the shortcomings involved in evaporative concentration, it has been found advantageous to freeze concentrate many products, particularly those having water as the liquid carrier. Generally, reduced energy is required since freeze concentrating relies on the heat of fusion instead of the heat of evaporation. In such a process, water is removed by first producing ice crystals which are then separated from the concentrate. Next, the ice crystals are washed to remove the remaining concentrate from them. The ice crystals can then be discarded, or melted if potable water is desired.

Various types of apparatus are used to cool the liquid mixture to form crystals of the solvent, including shell and tube heat exchangers, sometimes called freeze exchangers. Regardless of the apparatus used, the resulting liquid containing the crystals is generally transferred to a separate settling tank in which the crystals are separated by gravity from the liquid. The crystals, being less dense than the solvent or liquid, rise to the top. The resulting slurry is then transferred to another tank for washing and subsequent melting if the object is to obtain pure liquid from the process. While there are variations on the described system, they share the disadvantage of employing more equipment and piping than is desired and which can be made partially or totally ineffective by frozen liquid sticking or adhering to internal surfaces.

In systems which use a shell and tube freeze exchanger, it is generally impractical to freeze out more than a small amount of liquid in a single pass through the heat exchanger. To avoid wasting the energy used to cool the liquid, the liquid is advisably recirculated through the freeze exchanger. However, it is generally desirable to remove at least some of the frozen liquid crystals before the liquid is recirculated to prevent the slurry solids concentration from reaching a level which makes it difficult to pump. In addition, removal of the crystals makes it possible for more liquid to be recirculated and thus cooled in the freeze exchanger.

From the above it is believed clear that a need exists for an improved apparatus and method for removing frozen crystals from a liquid mixture so that the liquid can be recirculated, and the separated crystals washed, in a single vessel.

SUMMARY OF THE INVENTION

According to one aspect of the invention there is provided apparatus comprising a vertical vessel having a lower downwardly pointed conical shell portion, an intermediate shell portion and an upper shell portion wider than the lower intermediate portions and with all said vessel portions surrounding and defining an unobstructed interior; a conduit means for feeding a liquid stream, containing solids less dense than the liquid, tangentially to the vessel intermediate portion interior so that the liquid flows in a helical path therein and then flows downwardly to and in the lower conical portion whereby less dense liquid slurry concentrates in the central area of the lower conical portion and flows upwardly into the vessel upper portion while more dense liquid slurry concentrates in the vessel lower conical portion; and means to withdraw more dense liquid slurry from the vessel lower conical portion.

The vessel also desirably includes means for spraying, or otherwise distributing, a washing liquid onto the slurry while the slurry is in the vessel upper portion.

The vessel, in a more specific embodiment, can have an upper portion terminating in a horizontal edge; a scraper above the upper portion horizontal edge for scraping solids off the slurry top and over the horizontal edge; and a solids collecting means around the periphery of the vessel upper portion.

Significant additional advantages are obtained by combining a shell and tube heat exchanger with the vessel. A shell and tube heat exchanger, with a tube-side feed stream inlet and feed stream outlet, and means for supplying a cooling fluid to the shell side of the heat exchanger can be arranged so that the heat exchanger feed stream outlet is in direct communication with the conduit means on the vessel for feeding the liquid stream tangentially to the vessel intermediate portion interior. The heat exchanger is desirably positioned close to the vessel so that crystal-containing liquid only travels a short distance from the heat exchanger outlet to the vessel interior. This reduces the possibility of ice or other solids depositing on the equipment internal surfaces and helps to maintain a high helical flow rate in the vessel. Best results are obtained with the heat exchanger horizontal.

In another aspect of the apparatus, a liquid recycling conduit can be placed in communication with the lower end of the lower conical shell portion and the heat exchanger tube-side inlet for recirculating liquid through the heat exchanger to crystallize additional liquid. An inlet feed stream supply conduit can communicate with the recycling conduit so that it can intermix with the cooled liquid before it reaches the heat exchanger.

Also provided by the invention is a freeze concentration method of separating a liquid from a liquid mixture containing a dissolved or suspended material, said liquid being less dense in solid or crystal form than in liquid form, comprising cooling the liquid mixture containing the dissolved material to form crystals of the liquid; tangentially feeding the cold liquid mixture containing crystals of the liquid into the intermediate shell portion interior of a vertical vessel having a lower downwardly pointed conical shell portion, an intermediate shell portion and an upper shell portion wider than the lower and intermediate portions and with all said vessel portions surrounding and defining an unobstructed interior, so that the liquid flows in a helical path therein and then flows downwardly to and in the lower conical portion whereby a less dense liquid slurry of the crystals accumulates in the central area of the lower conical portion and flows upwardly into the vessel upper portion while a more dense liquid slurry of the crystals accumulates in the vessel lower conical portion; withdrawing the more dense liquid slurry from the vessel lower conical portion; and collecting the less dense liquid slurry in the vessel upper portion. The method desirably also includes washing the crystal solids in the vessel upper portion by spraying them with, or otherwise distributing over them, the same, but pure, liquid as in the feed stream, and removing the washed crystals from the vessel.

The liquid mixture can be brackish water, waste water, chemical solutions and dispersions, salt water or seawater, and fruit and vegetable juices. The liquid is generally water and ice is the solid or crystals formed.

Cooling the liquid mixture to form crystals of the liquid can be effected using the described process by passing the liquid through the tube side of a shell and tube heat exchanger cooled by a cooling fluid on the shell side. The heat exchanger can be horizontal and the crystal-containing liquid exiting the heat exchanger can be fed directly to the vessel.

When ice is the separated solid or crystals the washing liquid used in the process will generally be water.

DETAILED DESCRIPTION OF THE DRAWINGS

To the extent it is reasonable and practical, the same or similar elements or parts which appear in the various views of the drawings will be identified by the same numbers.

Figure 1:
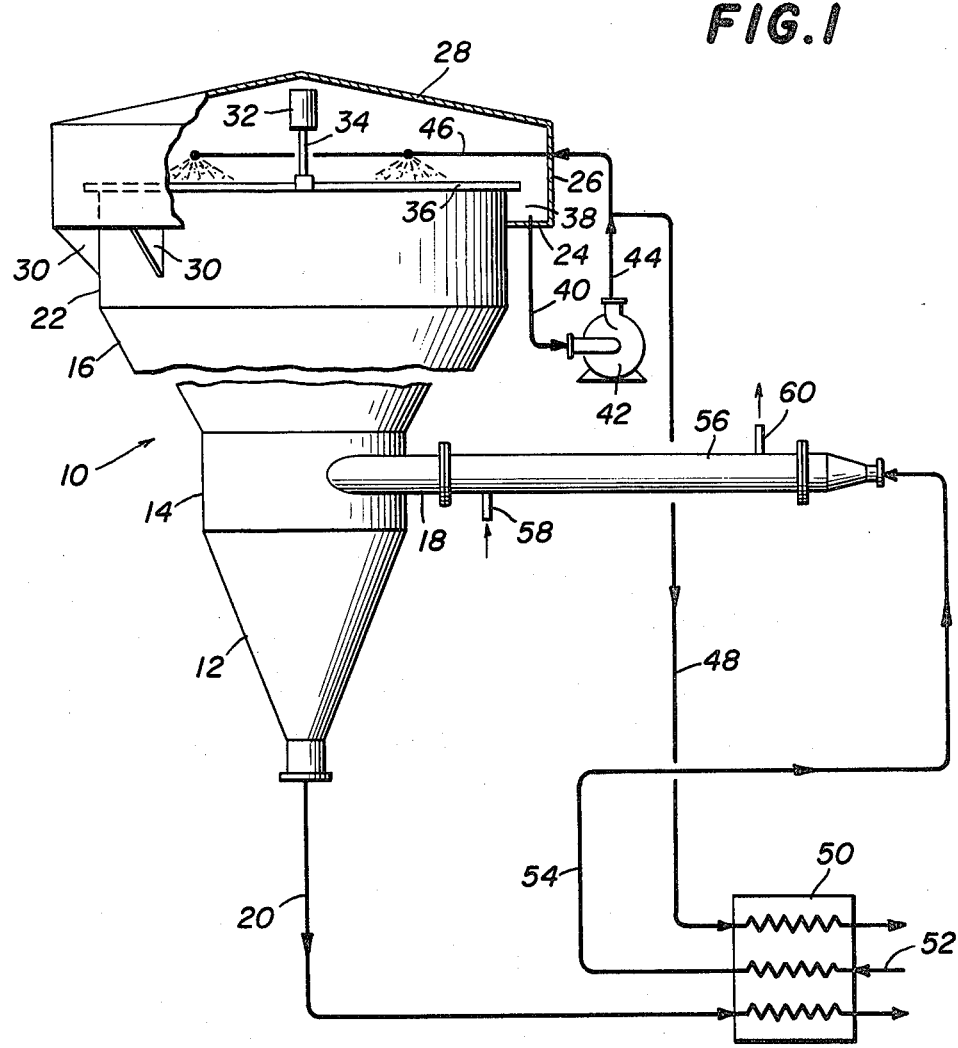
FIG. 1 is an elevational view, partially in section, of a vessel provided by the invention, together with auxiliary apparatus shown diagrammatically.

With reference to FIG. 1, the vessel 10 has a lower downwardly pointed conical shell portion 12, an intermediate shell portion 14 and an upper shell portion 16 wider than the lower and intermediate portions 12 and 14. The vessel portions 12, 14 and 16 surround and define an unobstructed interior space.

Conduit 18 communicates tangentially and horizontally with the intermediate shell portion 14 and serves to supply a liquid stream, containing solids less dense than the liquid, tangentially to the vessel intermediate portion interior. The liquid flows in a helical path in the intermediate shell portion 14 and then flows downwardly to and in the lower conical portion 12. As a result, less dense liquid slurry concentrates in the central area of the conical portion 12 and flows upwardly into the vessel upper portion 16 while more dense liquid slurry concentrates in the vessel lower conical portion 12.

Conduit 20 communicates with the bottom of lower conical shell portion 12 and provides a means to withdraw more dense liquid slurry from the vessel.

The upper shell portion 16, which is conically shaped as shown in FIG. 1, is joined at its upper end to cylindrical circular shell 22 in which the liquid slurry accumulates. A horizontal ring plate 24 is connected to the outer surface of shell 22. Cylindrical shell 26 projects upwardly from plate 24 and supports conical roof 28. Vertical triangular braces 30 help supporting ring plate 24.

Mounted beneath roof 28 is drive means 32 having vertical shaft 34 connected to horizontal rotatable scraper arm 36 which is located at the top edge of shell 22. As the scraper arm 36 rotates, the solids which move upwardly in shells 16 and 22 are pushed into well 38, which can be provided with means for heating (not shown) to melt the solids.

Conduit 40 communicates with the bottom of well 38 and liquid pump 42. Conduit 44 extends from the outlet of pump 42 to a conduit 46 which is provided with a plurality of downwardly directed spray nozzles for spraying a clean liquid over the solids in shell 22 to wash them before the scraper arm delivers the solids to well 38.

Branch conduit 48 extends from conduit 44 to heat exchanger 50 and is used to supply cold liquid to the heat exchanger to cool the incoming feed stream supplied thereto by conduit 52. The cold liquid withdrawn from vessel 12 by conduit 20 is also routed through heat exchanger 50 to utilize its cooling capacity before it is disposed of.

The incoming feed stream, after being cooled in heat exchanger 50, is fed by conduit 54 to the inlet end of shell and tube freeze exchanger 56. The shell side of freeze exchanger 56 is cooled by a circulating cooling fluid supplied by inlet 58 and removed by outlet 60.

As the feed stream flows through the tubes in freeze exchanger 56 it is lowered to a temperature which causes solid particles or crystals of the liquid to form, thereby resulting in a dilute slurry. The dilute slurry exits from the outlet of heat exchanger 56 directly into tangential conduit 18 which feeds it into the vessel 10 as previously described.

The apparatus illustrated by FIG. 1 and described above is suitable for use in producing potable water from brackish water and salt water. The ice recovered from the slurry can be melted in well 38 and high quality water obtained for human and animal consumption, as well as for commercial and industrial purposes.

Figure 3:
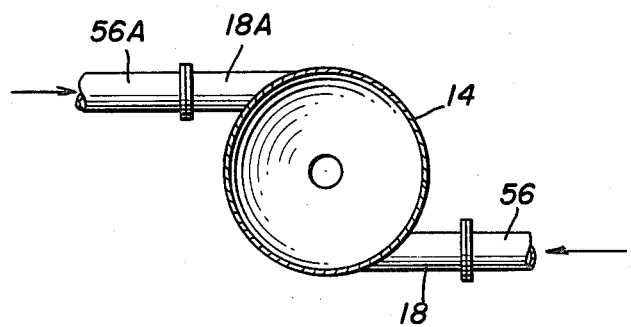
FIG. 3 is a sectional view taken along the line 3—3 of FIG. 2.
Figure 2:
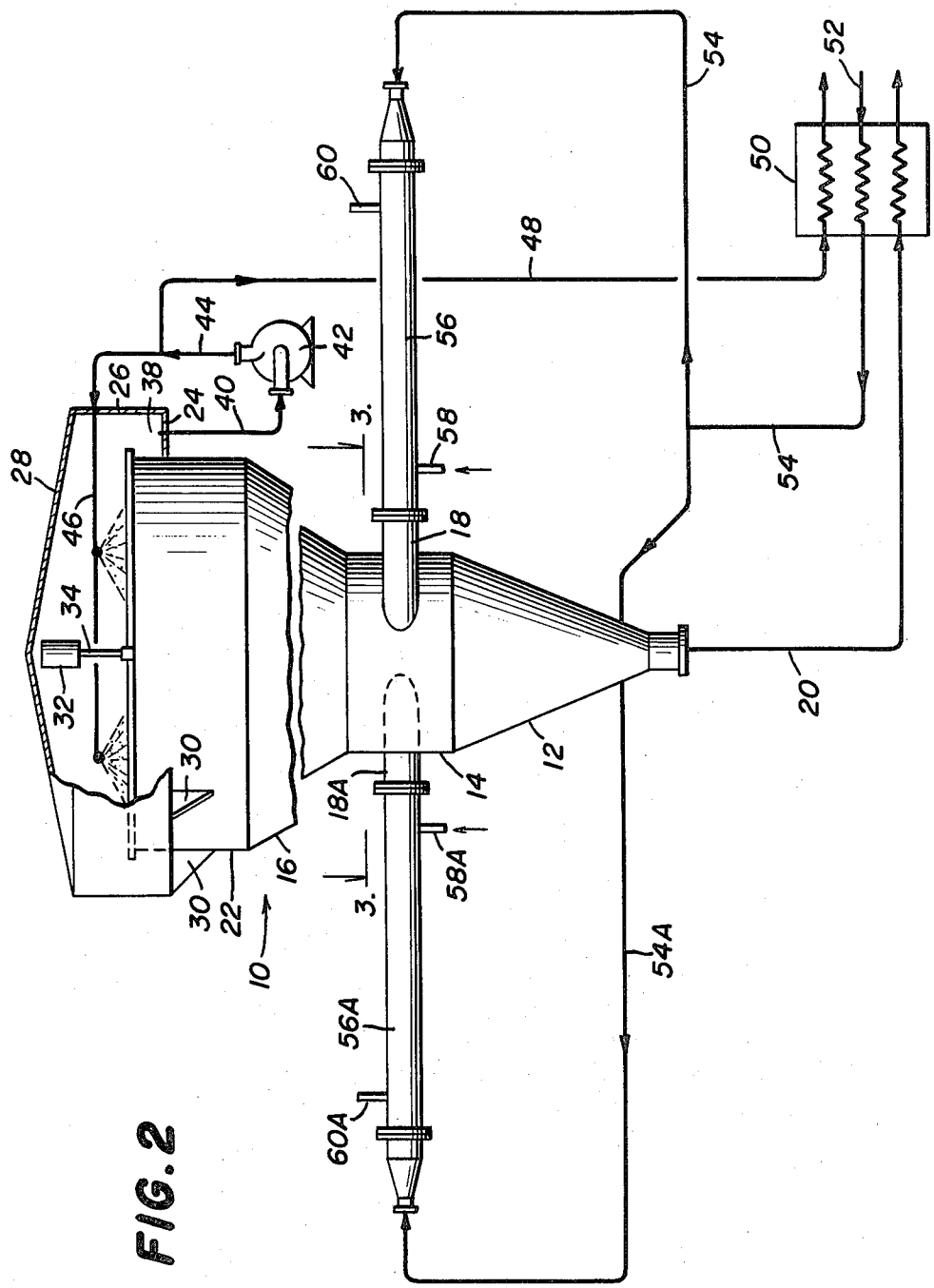
FIG. 2 is similar to FIG. 1 but it shows two freeze exchangers for feeding liquid streams containing solids to the vessel instead of one freeze exchanger as shown in FIG. 1.

FIGS. 2 and 3 illustrate a second embodiment of the invention. This second embodiment, however, incorporates all of the apparatus shown in FIG. 1 but, in addition, it includes a second freeze exchanger 56A which is identical to freeze exchanger 56. Furthermore, those elements shown in FIGS. 2 and 3 which are identical to those shown in FIG. 1, but which pertain to the second freeze exchanger 56A, have been identified by adding the letter "A" after the number used to identify the same element in FIG. 1.

The embodiment shown in FIGS. 2 and 3 permits greater production of frozen out solids than the first embodiment illustrated in FIG. 1 because of the use of two freeze exchangers, assuming that all of the freeze exchangers are identical.

The apparatus described above employs flooded pressurized separation of solids and freezer operation. As a result, no air-liquid interfaces which promote ice collection and freeze-up are formed. In addition, there is enhanced separation of solids because of the hydrodynamics in the separation vessel 10.

The lack of internal elements in the vessel 10 eliminates structures which promote ice collection and freeze-up. This is also so with respect to the counter current ice washer, constituting the space within shell 22, which also is free of internal elements which promote ice stagnation and freeze-up.

The high flow velocity and low ice fraction on the vessel walls guard against ice build-up in the separator vessel.

One of the problems with the eutectic freeze desalination process is the separation of the components generated: brine, ice, and a salt hydrate precipitate. The described apparatus provides a ready means of separating both the brine and salt hydrate precipitate because they are both more dense than ice and settle to the bottom in lower conical shell portion 12.

The foregoing detailed description has been given for clearness of understanding only, and no unnecessary limitations should be understood therefrom, as modifications will be obvious to those skilled in the art.

What is claimed is:

1. A freeze concentration method of separating a liquid from a liquid mixture containing a dissolved material, said liquid being less dense in solid form than in liquid form, comprising:
    cooling the liquid mixture containing the dissolved material to form crystals of the liquid;
    tangentially feeding the cold liquid mixture containing crystals of the liquid into the intermediate shell portion interior of a vertical vessel having a lower downwardly pointed conical shell portion, an intermediate shell portion and an upper shell portion wider than the lower and intermediate portions and with all said vessel portions surrounding and defining an unobstructed interior, so that the liquid flows in a helical path therein and then flows downwardly to and in the lower conical portion whereby a less dense liquid slurry of the crystals accumulates in the central area of the lower conical portion and flows upwardly into the vessel upper portion while a more dense liquid slurry of the crystals accumulates in the vessel lower conical portion;
    withdrawing the more dense liquid slurry from the vessel lower conical portion;
    collecting the less dense liquid slurry in the vessel upper portion; and
    removing the crystals from the vessel upper portion.

2. A freeze concentration method according to claim 1 in which the crystals collected in the vessel upper portion are washed by distributing over them the same, but pure, liquid as in the feed stream.

3. A method according to claim 1 in which the liquid mixture is sea water, brackish water, or other salt water, and the crystals are ice.

4. A method according to claim 3 in which the washing liquid is water.

5. A method according to claim 1 in which cooling the liquid mixture to form crystals of the liquid is effected by passing it through the tube-side of a shell and tube heat exchanger cooled by a cooling fluid on the shell side.

6. A method according to claim 5 in which the heat exchanger is horizontal and the crystal-containing liquid exiting the heat exchanger is fed directly to the vessel.

7. Apparatus comprising:
    a vertical vessel having a lower downwardly pointed conical shell portion, an intermediate shell portion and an upper shell portion wider than the lower and intermediate portions and with all said vessel portions surrounding and defining an unobstructed interior;
    a conduit means for feeding a liquid stream, containing solids less dense than the liquid, tangentially to the vessel intermediate portion interior so that the liquid flows in a helical path therein and then flows downwardly to and in the lower conical portion whereby less dense liquid slurry concentrates in the central area of the lower conical portion and flows upwardly into the vessel upper portion while more dense liquid slurry concentrates in the vessel lower conical portion; and
    means to withdraw more dense liquid slurry from the vessel lower conical portion.

8. Apparatus according to claim 7 including means for distributing a washing liquid onto the slurry while the slurry is in the vessel upper portion.

9. Apparatus according to claim 7 in which:
    the vessel upper portion terminates in a horizontal edge;
    a scraper is positioned above the upper portion horizontal edge for scraping solids off the slurry top and over the horizontal edge; and
    a solids collecting means is located around at least part of the periphery of the vessel upper portion.

10. Apparatus according to claim 7 including a shell and tube heat exchanger, with a tube-side feed stream inlet and feed stream outlet, and means for supplying a cooling fluid to the shell side of the heat exchanger, with the heat exchanger feed stream outlet in direct communication with the conduit means on the vessel for feeding the liquid stream tangentially to the vessel intermediate portion interior.

11. Apparatus according to claim 10 in which the heat exchanger is horizontal and is connected axially to the conduit means which is horizontal.

12. Apparatus according to claim 10 including a liquid recycling conduit in communication with the lower end of the lower conical shell portion and the heat exchanger tube-side inlet for recirculating fluid through the heat exchanger to crystallize additional liquid and further concentrate material dissolved in the liquid.

13. Apparatus according to claim 12 including an inlet feed stream supply conduit communicating with the recycling conduit.

* * * * *